United States Patent
Menich et al.

(10) Patent No.: US 6,449,305 B1
(45) Date of Patent: Sep. 10, 2002

(54) METHOD AND APPARATUS FOR PERFORMING HANDOFF IN A SPREAD-SPECTRUM COMMUNICATION SYSTEM

(75) Inventors: Barry J. Menich, Schaumburg; James P. Aldrich, Glendale Heights; Samuel D. Fernandez, Hoffman Estates, all of IL (US)

(73) Assignee: Motorola, Inc., Schaumburg, IL (US)

( * ) Notice: Subject to any disclaimer, the term of this patent is extended or adjusted under 35 U.S.C. 154(b) by 977 days.

(21) Appl. No.: 08/644,465

(22) Filed: May 10, 1996

(51) Int. Cl.[7] ............................. H04K 1/00; H04Q 7/20
(52) U.S. Cl. ....................................... 375/141; 455/436
(58) Field of Search ................................ 375/200, 205, 375/371, 316, 130, 141, 146, 147; 379/60; 455/33.2, 51.1, 67.6, 456, 436–444; 370/331, 332, 335

(56) References Cited

U.S. PATENT DOCUMENTS

| | | | | |
|---|---|---|---|---|
| 5,054,035 A | * | 10/1991 | Tarallo et al. ............. | 455/33.2 |
| 5,101,501 A | * | 3/1992 | Gilhousen et al. ......... | 455/33.2 |
| 5,293,643 A | * | 3/1994 | Israelsson .................. | 455/33.2 |
| 5,313,489 A | * | 5/1994 | Menich et al. ............. | 375/200 |
| 5,491,717 A | * | 2/1996 | Hall ........................... | 455/33.2 |
| 5,548,808 A | * | 8/1996 | Bruckert et al. ........... | 455/33.2 |

FOREIGN PATENT DOCUMENTS

WO      WO 97/43837      * 10/1997

* cited by examiner

*Primary Examiner*—Tesfaldet Bocure
(74) *Attorney, Agent, or Firm*—Richard A. Sonnentag

(57) ABSTRACT

Handoff from a Code-Division, Multiple Access (CDMA) protocol to an Advanced Mobile Phone Service (AMPS) protocol occurs by comparing a remote unit's (405) phase shift measurement to a threshold (503) and determining a reference CDMA base station (401) from an active set of CDMA base stations (515). Next, corrected phase shifts are calculated for each CDMA base station in the active set (521) and the remote unit (405) is handed off to an AMPS base station (109) underlying the CDMA coverage area (126) having the smallest corrected phase shift (525).

16 Claims, 5 Drawing Sheets

— PRIOR ART —

METHOD AND APPARATUS FOR PERFORMING HANDOFF IN A SPREAD-SPECTRUM COMMUNICATION SYSTEM

FIELD OF THE INVENTION

The present invention relates generally to wireless communication systems and, in particular, to handoff in a spread-spectrum communication system.

BACKGROUND OF THE INVENTION

Wireless communication systems are known to employ handoff methods in which a remote unit (such as a cellular subscriber) is handed off between base stations within the communication system. In particular, when a remote unit moves to the periphery of the serving base station's coverage area, the increase in path losses between the serving base stations and the remote unit may create a situation in which an adjacent base station can better serve the remote unit. As described in the Electronic Industry Association/Telecommunications Industry Association Interim Standard 95A (TIA/EIA/IS-95A), one such communication system employing handoff is a Code-Division, Multiple-Access (CDMA) spread-spectrum communication system. (EIA/TIA can be contacted at 2001 Pennsylvania Ave. NW Washington D.C. 20006). Handoff in a CDMA communication system may be accomplished by simultaneously monitoring several base stations (referred to as an active set) and replacing a base station within the active set if a base station with a stronger signal is encountered. Although TIA/EIA/IS-95A provides for a method for handoff between a CDMA base station and a base station utilizing other communication system protocols (such as the Advanced Mobile Phone Service (AMPS) protocol), TIA/EIA/IS-95A does not provide when such handoff should occur. Because of this, it has been left up to equipment manufacturers to develop methods for handing off from CDMA to other system protocols.

A prior-art method for handoff from a CDMA to an AMPS protocol is illustrated in reference to FIG. 1. Referring to FIG. 1, communication system 100 includes a plurality of CDMA base stations 101–107 having respective coverage areas 122–128. Communication system 100 additionally includes a plurality of AMPS base stations 109–115 having respective coverage areas 126–132. Remote unit 117 is capable of operating on both an AMPS and a CDMA protocol. At time t=1, remote unit 117, traveling along path 119, is in soft handoff (i.e. communicating with more than one base station) with non-border CDMA base stations 101 and 103. (Non-border base stations are those CDMA base stations with no corresponding AMPS coverage area). At time t=2, remote unit 117 moves into coverage area 126 and continues in a soft-handoff state communicating with non-border CDMA base stations 101 and 103, and additionally communicating with border CDMA base station 105. At time t=3, remote unit 117 moves out of coverage area 124 and is placed in soft handoff with non-border CDMA base station 101 and border CDMA base station 105. Finally, at time t=4, remote unit travels out of coverage area 122 communicating only with border CDMA base station 105.

The prior-art method of handoff from a CDMA to an AMPS protocol immediately hands off remote unit 117 to AMPS base station 109 when remote unit 117 is no longer communicating with a non-border CDMA base station. In other words, remote unit 117 is handed off to AMPS base station 109 immediately upon losing communication with non-border CDMA base station 101. This prior-art method of handoff from a CDMA to an AMPS protocol is inefficient in that CDMA capacity may be wasted by prematurely handing off remote unit 117 to AMPS base station 109.

Thus a need exists for a method and apparatus for handoff in a spread-spectrum communication system that overcomes the deficiencies of the prior art.

DETAILED DESCRIPTION OF THE DRAWINGS

Stated generally, handoff from a CDMA protocol to an AMPS protocol occurs by comparing a remote unit's phase shift measurement to a threshold and determining a reference CDMA base station from an active set of CDMA base stations. Next, corrected phase shifts are calculated for each CDMA base station in the active set and the remote unit is handed off to an AMPS base station underlying the CDMA coverage area having the smallest corrected phase shift. Waiting until a threshold event is received by the remote unit prior to handing off to an AMPS base station allows the remote unit to travel farther into the CDMA coverage area of the border cell prior to being handed off to the underlying AMPS base station thereby increasing CDMA system capacity.

The present invention encompasses a method for performing handoff in a spread-spectrum communication system comprising the steps of measuring an uncorrected phase shift of a remote unit and comparing the measured phase shift to a threshold. The measured phase shift is corrected and the remote unit is handed off based on the corrected phase shift and the comparison.

An alternate embodiment encompasses a method for handoff in a spread-spectrum communication system comprising the steps of communicating between a first base station and a remote unit on a first frequency and measuring a phase shift of the remote. The phase shift is compared to a threshold and communication between the first base station and the remote unit takes place on a second frequency based on the comparison.

Yet another embodiment encompasses a method of handoff in a Code-Division, Multiple-Access (CDMA) communication system comprising the steps of communicating with a plurality of base stations and measuring a phase shift of the plurality of base stations. A determination is made whether a base station existing within the plurality of base stations is a non-border base station and the base stations phase shift measurements are compared to thresholds. The phase shift measurements are corrected and the remote unit is handed off based on the corrected phase shift measurements.

An alternate embodiment encompasses an apparatus performing handoff in a communication system comprising means for measuring an uncorrected phase shift of a remote unit, means, coupled to means for measuring, for comparing the measured phase shift to a threshold, means, coupled to means for comparing, for correcting the measured phase shift, and means, coupled to means for correcting, for handing off the remote unit based on the corrected phase shift and the comparison.

Figure 1:
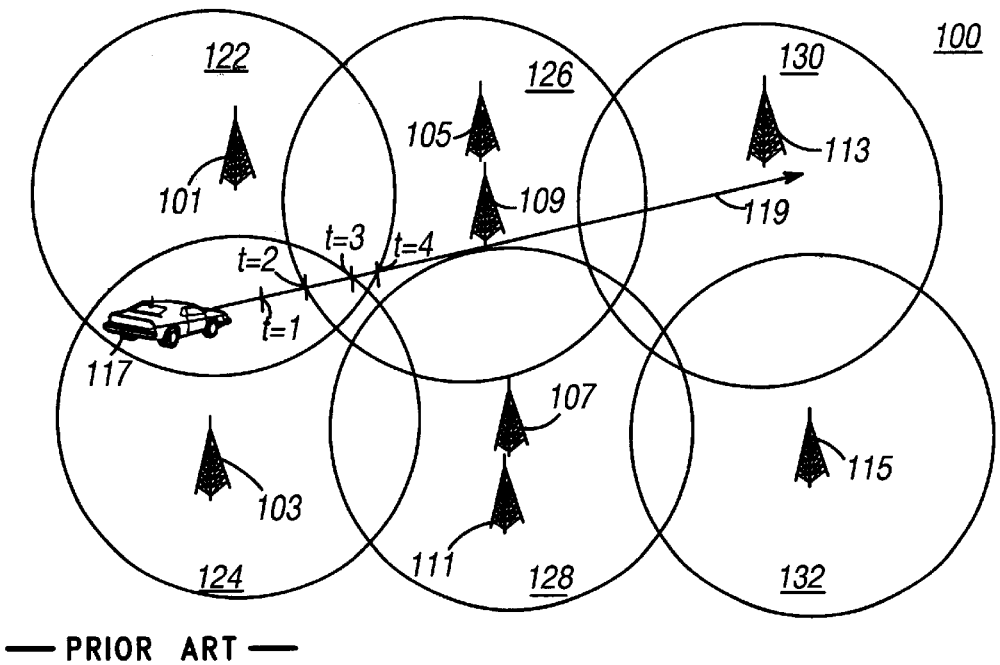
FIG. 1 illustrates a wireless communication system employing both a code-division multiple-access (CDMA) protocol and an Advanced Mobile Phone Service (AMPS) protocol.
Figure 2:
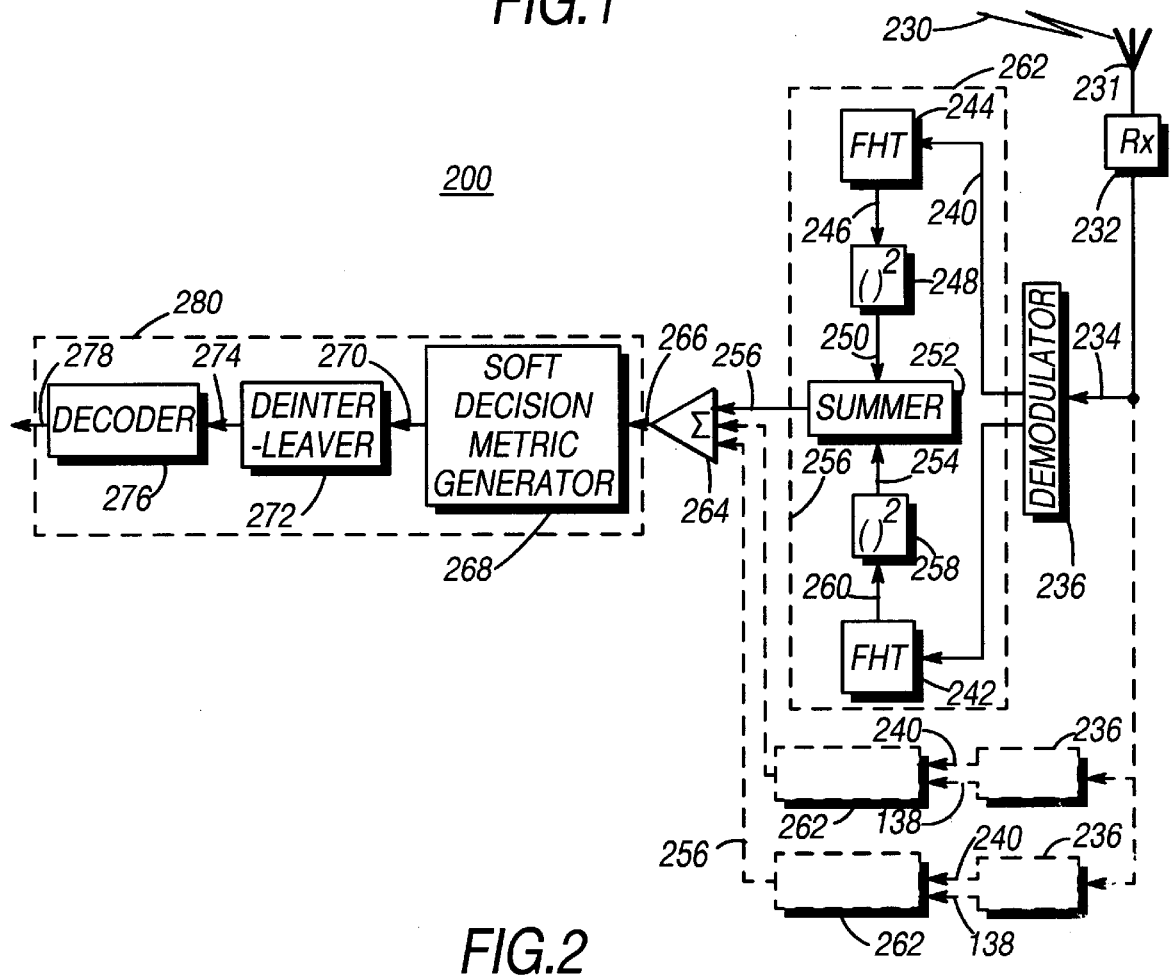
FIG. 2 is a block diagram of a preferred embodiment of a base station receiver that can utilize the present invention.

FIG. 2 is a block diagram of a preferred embodiment of a base station receiver 200 for receiving a remote unit's transmitted signal 230. In a preferred embodiment, base station receiver 200 is incorporated into CDMA base stations 101–107. Orthogonally encoded spread-spectrum digital signal 230 is received at receive antenna 231 and amplified by receiver 232 before being despread and demodulated 236 into in-phase 240 and quadrature 238 components. Components 238, 240 of despread digital samples are then grouped into predetermined length groups (e.g., 64 sample length groups) of sampled signals that are independently input to orthogonal decoders in the form of fast Hadamard transformers 242, 244, which despread the orthogonally encoded signal components producing a plurality of despread signal components 246 and 260, respectively (e.g. when 64 sample length groups are input, then 64 despread signals are generated). In addition, each transformer output signal 246, 260 has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The energy values with the same Walsh index in each group of resulting signal 256 from each branch of receiver 200 will then be summed at summer 264 to provide a group of summed energy values 266. The energy value with index i in the group of summed energy values 266 corresponds to a measure of confidence that the group of sampled signals, which generate this group of summed energy values 266, corresponds to the i-th Walsh symbol. The group of summed energy values with associated indices will then be sent to a soft decision metric generator 268 where a single metric for each encoded data bit is determined, thereby producing a single set of aggregate soft decision data 270. The aggregate soft decision data 270 is then deinterleaved by deinterleaver 272 prior to final maximum likelihood decoding by decoder 276.

Figure 3:
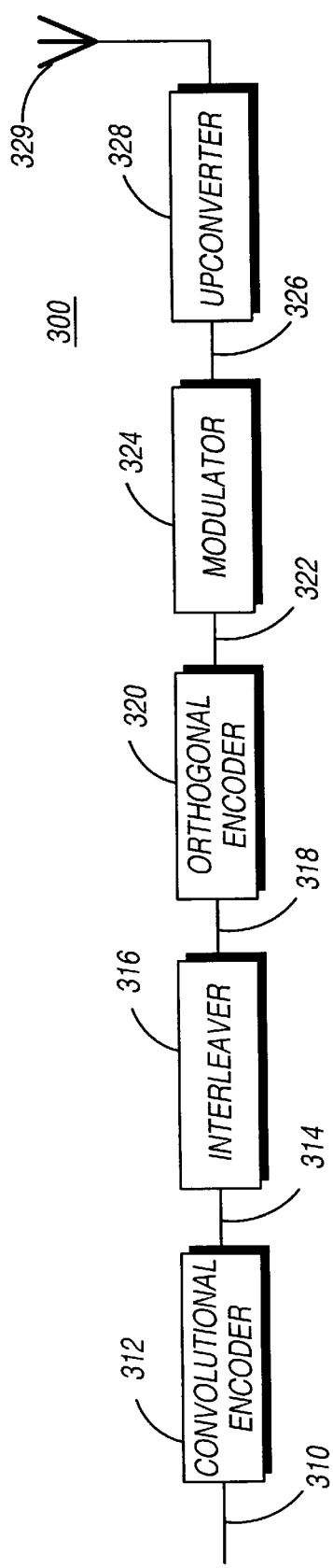
FIG. 3 is a block diagram of a preferred embodiment of a base station transmitter that can utilize the present invention.

FIG. 3 is a block diagram of a preferred embodiment of a CDMA transmitter 300 for transmitting signal 310 to a remote unit. In a preferred embodiment, transmitter 300 is incorporated into CDMA base stations 101–107. Transmitter 300 is preferably a transmitter such as that defined by TIA/EIA/IS-95A. Transmitter 300 includes convolutional encoder 312, interleaver 316, orthogonal encoder 320, modulator 324, upconverter 328, and antenna 329.

During operation, signal 310 (traffic channel data bits) is received by convolutional encoder 312 at a particular bit rate (e.g., 9.6 kbit/second). Input traffic channel data 310 bits typically include voice converted to data by a vocoder, pure data, or a combination of the two types of data. Convolutional encoder 312 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 312 encodes input data bits 310 (received at a rate of 9.6 kbitsecond) at a fixed encoding rate of one data bit to two data symbols (i.e., rate ½) such that convolutional encoder 312 outputs data symbols 314 at a 19.2 ksymbol/second rate.

Data symbols 314 are then input into interleaver 316. Interleaver 316 interleaves the input data symbols 314 at the symbol level. In interleaver 316, data symbols 314 are individually input into a matrix which defines a predetermined size block of data symbols 314. Data symbols 314 are input into locations within the matrix so that the matrix is filled in a column by column manner. Data symbols 314 are individually output from locations within the matrix so that the matrix is emptied in a row by row manner.

Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 316 at the same data symbol rate that they were input (e.g., 19.2 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 19.2 ksymbol/second times 20 milliseconds which equals 384 data symbols which defines a 16 by 24 matrix.

Interleaved data symbols 318 are input to orthogonal encoder 320.

Orthogonal encoder 320 modulo 2 adds an orthogonal code (e.g., a 64-ary Walsh code) to each interleaved and scrambled data symbol 318. For example, in 64-ary orthogonal encoding, interleaved and scrambled data symbols 318 are each replaced by a 64 symbol orthogonal code or its inverse. These 64 orthogonal codes preferably correspond to Walsh codes from a 64 by 64 Hadamard matrix wherein a Walsh code is a single row or column of the matrix. Orthogonal encoder 320 repetitively outputs a Walsh code or its inverse 322 which corresponds to input data symbol 318 at a fixed symbol rate (e.g., 19.2 ksymbol/second).

The sequence of Walsh codes 322 is prepared for transmission over a communication channel by modulator 324. The spreading code is a user specific sequence of symbols or unique user code which is output at a fixed chip rate (e.g., 1.228 Mchip/second). In addition, the user code spread encoded chips are scrambled by a pair of short pseudorandom codes (i.e. short when compared to the long code) to generate an I-channel and Q-channel code spread sequence. The I-channel and Q-channel code spread sequences are used to bi-phase modulate a quadrature pair of sinusoids by driving the power level controls of the pair of sinusoids. The sinusoids output signals are summed, bandpass filtered, translated to an RF frequency, amplified, filtered via upconverter 328 and radiated by an antenna 329 to complete transmission of the channel data bits 310.

In a preferred embodiment of the present invention, a corrected phase shift (defined as a corrected time between a base station's transmitted signal and a corresponding received signal transmitted from a remote unit), for each CDMA base station in the active set is utilized in determining when to handoff a remote unit from a CDMA to an AMPS protocol. Although the preferred embodiment is illustrated by describing handoff off a remote unit between CDMA and AMPS protocols, one of ordinary skill in the art will recognize that the remote unit may be handed off to other system protocols (such as the Personal Digital Cellular (PDC) system, United States Digital Cellular (USDC), or Total Access Communication System (TACS)) as well.

Prior to illustrating a preferred embodiment of handing off a remote unit from a CDMA to an AMPS protocol, it will be illustrative to discuss the derivation of a corrected phase shift for a CDMA base station.

Measurement of Corrected Phase Shift

Figure 4:
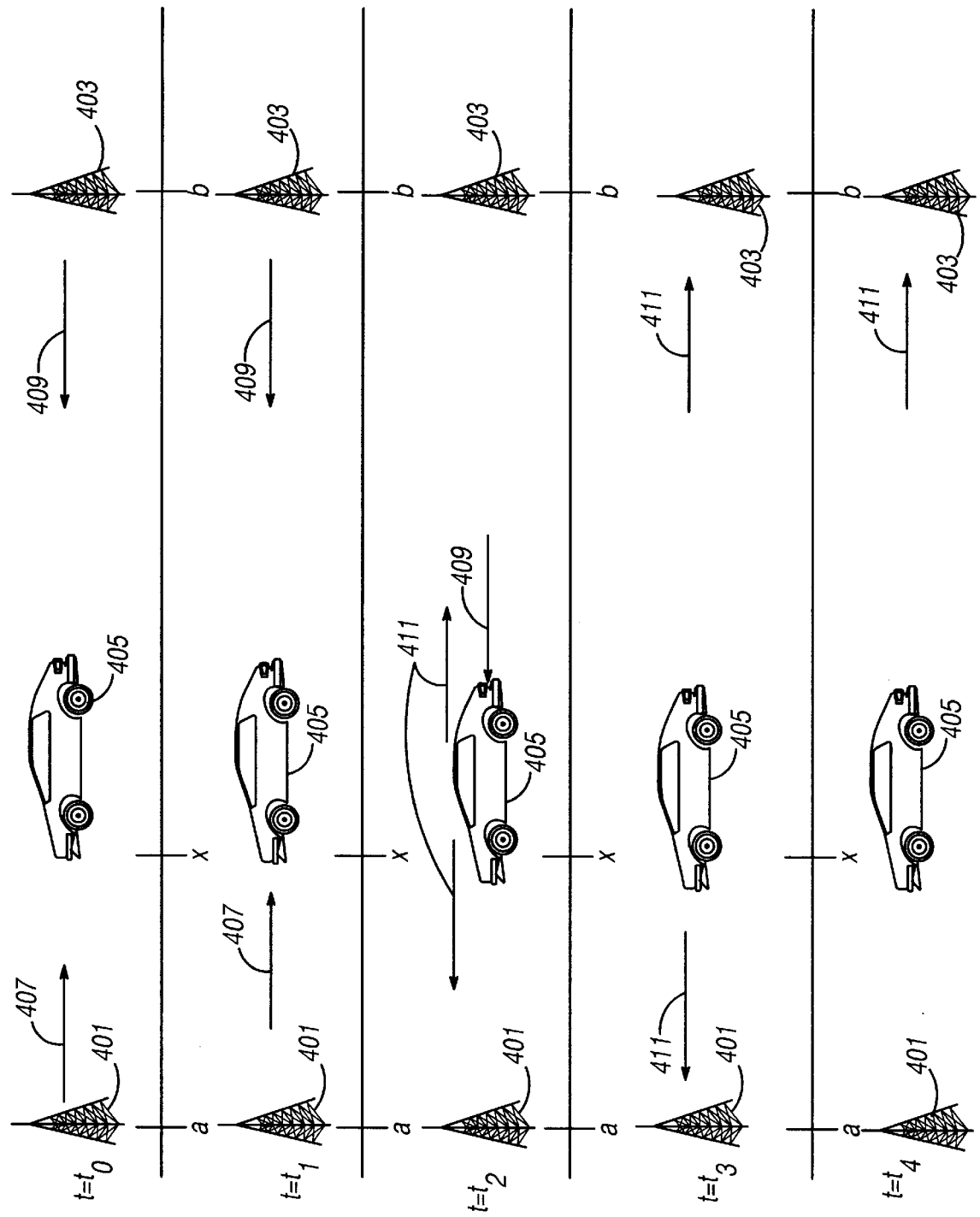
FIG. 4 illustrates a remote unit in two-way soft handoff in accordance with a preferred embodiment of the present invention.

A preferred embodiment for determining a remote unit's uncorrected phase shift is illustrated in reference to FIG. 4. As shown in FIG. 4, remote unit 405 lies between CDMA base stations 401 and 403 with CDMA base station 401 providing a reference pilot. (The reference pilot is used by the remote unit 405 for uplink transmission timing). Remote unit 405 is a distance (x−a) from CDMA base station 401, and a distance (b−x) from CDMA base station 403. At time $t_0$ both CDMA base station 401 and 403 transmit similar downlink signals 407 and 409, respectively, to remote unit 405. At time $t_1$, downlink signal 407 transmitted from CDMA base station 401 reaches remote unit 405. At time $t_2$, remote unit 405 responds to CDMA base station's 401 downlink signal 407 by transmitting uplink signal 411. At time $t_3$, uplink transmission 411 reaches CDMA base station 401, and finally at time $t_4$, uplink transmission 411 reaches CDMA base station 403.

Since CDMA base station 401 supplies the reference pilot to remote unit 405, remote unit 405 initiates uplink transmission 411 on reception of downlink transmission signal 407 (reference pilot). Thus CDMA base station 401 will measure a phase shift of $\Phi_1$ where $$\Phi_1 = t_3 - t_0 = 2*(x-a)/c$$

where c is the propagation speed of downlink signal 407. Since uplink transmission 411 was initiated prior to downlink transmission signal 409 reaching remote unit 405, CDMA base station 403 will measure an uncorrected phase shift of $\Phi_2$ where $$\Phi_2 = t_4 - t_0 = (x-a)/c + (b-x)/c = \frac{1}{2}*\Phi_1 + (b-x)/c.$$

Thus, non-reference CDMA base station 403 will always under estimate the phase shift between itself and a remote unit by measuring a phase shift of $\Phi_2$ due to the fact that uplink transmission 411 is initiated prior to downlink transmission 409 reaching mobile unit 405. Because of this, the phase shift of a reference CDMA base station ($\Phi_{reference}$) must be taken into consideration when deriving a corrected phase shift between base station 403 and remote unit 405.

Utilizing TIA/EIA/IS95A protocol, when requested for a Pilot Strength Measurement Message (PSMM), remote unit 405 will report to CDMA base stations 401 and 403 which CDMA base station that remote unit 405 is utilizing as a reference pilot. In addition, remote unit 405 will also supply the time difference in received signals 407 and 409 ($\Psi$). By itself, the time difference in received signals 407 and 409 supplied by the PSMM only reveals how much closer remote unit 405 is to CDMA base station 401 than to CDMA base station 403. However, if the identity of the reference pilot is known, along with any $\Phi$, then corrected phase shifts ($\Theta_1$, $\Theta_2$) can be solved for by utilizing equations $$\Theta_1 = \Phi_1,$$

$$\Theta_2 = 2*\Phi_2 - \Phi_1, \text{ and}$$

$$\Psi = \Phi_2 - \Phi_1$$

Although the above example illustrates how to obtain $\Theta_1$ and $\Theta_2$ when a remote unit is in soft handoff between two CDMA base stations, this analysis may be extended to the situation where a remote unit is in N-way handoff with more than two CDMA base stations.

Determination When to Handoff from CDMA to AMPS

Figure 5:
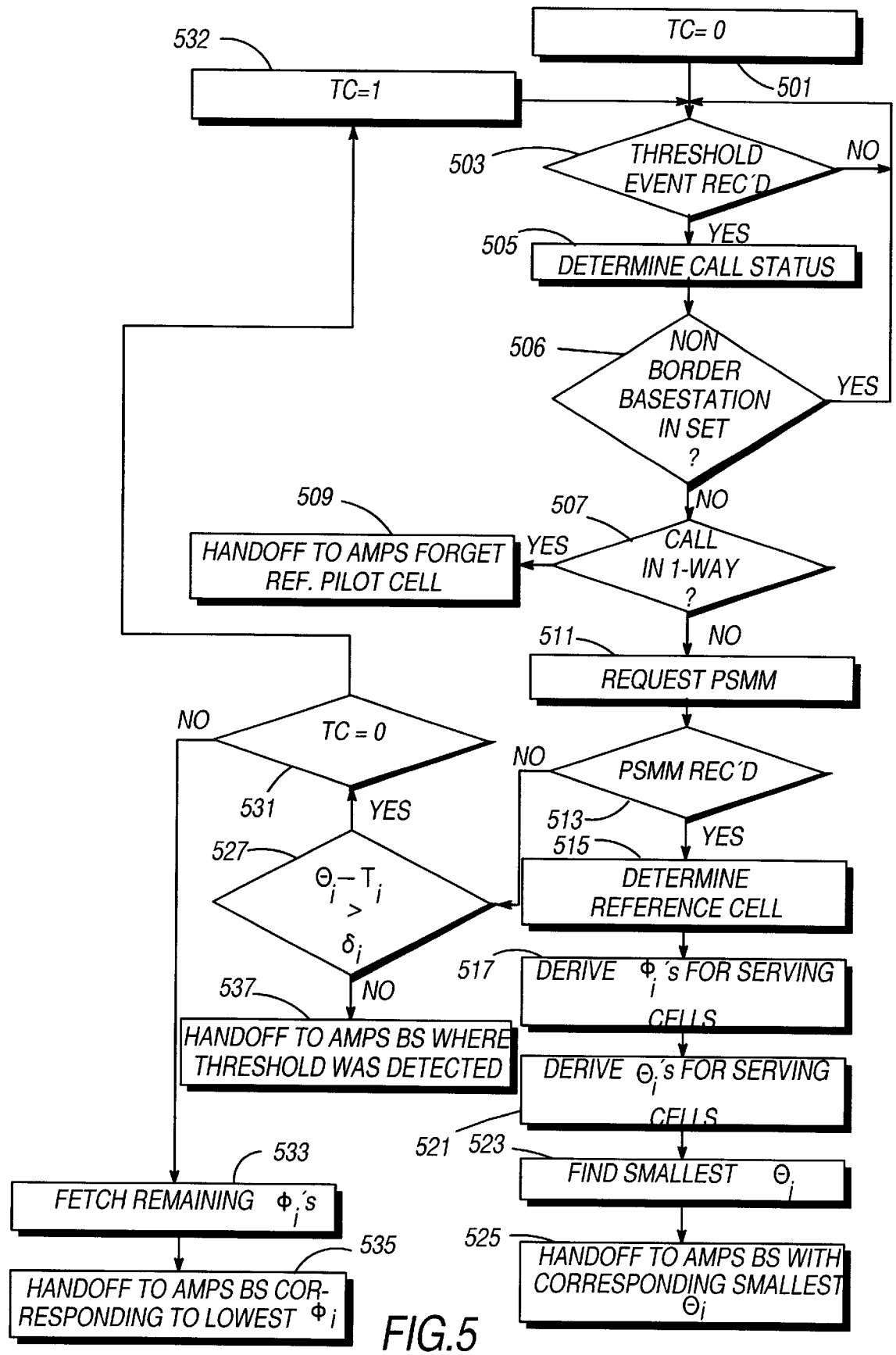
FIG. 5 illustrates a logic-flow diagram of a preferred embodiment for handing off a remote unit from a CMDA protocol to an AMPS protocol in accordance with a preferred embodiment of the invention.

FIG. 5 illustrates a logic-flow diagram of a preferred embodiment for handing off a remote unit from a CMDA protocol to another system protocol. In a preferred embodiment the remote unit is handed off from a ODMA protocol to an AMPS protocol. In the preferred embodiment, uncorrected phase shifts ($\Phi_1$, $\Phi_2$, $\Phi_3$) of all base stations in soft handoff are compared to phase shift thresholds ($\tau_1$, $\tau_2$, $\tau_3$) to yield a handoff decision for handing off a remote unit from a CDMA protocol to an AMPS protocol. The remote unit is then handed off to an AMPS base station underlying the CDMA base station having the smallest corrected phase shift.

The logic flow begins at step 501 with a threshold count set to zero. In the preferred embodiment, the threshold count is utilized to determine how many threshold events have occurred. At step 503, the base station checks to determine if a threshold event has been received. In the preferred embodiment, only border CDMA base stations are assigned a phase shift threshold ($\tau$). Thus, any threshold event received indicates that at least one border CDMA base station is part of the active set. In an alternate embodiment, thresholding is not enabled if a non-border CDMA base station is in the active set, thus no threshold event is received if a non-border CDMA base station is in the active set. In the preferred embodiment, a threshold event is received if any of the CDMA base stations in soft handoff with the remote unit has an uncorrected phase shift ($\Phi_1$) that exceeds a phase shift threshold value ($\tau_1$). In particular, a threshold event is received if any $$\Phi_i > \tau_i.$$

Continuing, if at step 503, the remote unit receives no threshold event, then the logic flow simply returns to step 503, otherwise the logic flow continues to step 505. At step 505 the base station notifies the infrastructure equipment that a threshold event has occurred, and the infrastructure equipment (such as a centralized base station controller, not shown) determines a call status. In the preferred embodiment, the call status indicates to the infrastructure equipment the identification of the serving base stations along with the handoff status of the remote unit (1-way, 2-way, 3-way, . . . etc.). Next, at step 506, the infrastructure equipment determines if at least one CDMA base station in the active set is a non-border CDMA base station. In an alternate embodiment, step 506 may determine if a majority of CDMA base stations in the active set are non-border CDMA base stations, but in the preferred embodiment, soft handoff between a border cell and a non-border cell will not trigger a handoff of the remote unit to an underlying AMPS base station, even if a threshold event occurred. Thus, if at step 506 it is determined that at least one serving CDMA base station is a non-border base station, then the logic flow returns to step 503, otherwise the logic flow continues to step 507.

At step 507, the infrastructure equipment determines if the remote unit is currently in 1-way handoff, and if so, the logic flow continues to step 509 where the remote unit is handed off to an underlying AMPS base station. If at step 507, it is determined that the remote unit is not currently in 1-way handoff, then at step 511 a PSMM is solicited from the remote unit.

Due to path losses between the serving CDMA base stations and the remote unit, it is possible that the PSMM may fail to reach the infrastructure equipment. Thus there may exist situations where $\Phi_{reference}$ cannot be determined and corrected phase shifts ($\Theta_1$, $\Theta_2$, $\Theta_3$) for the serving CDMA base stations are unavailable. Because of this, at step 513 the infrastructure equipment determines if a PSMM has been received. If at step 513 the infrastructure equipment determines that a PSMM has not been received, the logic flow continues to step 527 where it is determined if $\Phi_i >> \tau_l$. This is accomplished by having a secondary threshold $\delta_l$ in which ($\Phi_i-\tau_l$) is compared, and checking if ($\Phi_i-\tau_l$)>$\delta_l$ (at step 527). If at step 527 ($\Phi_1-\tau_l$) is not greater than $\delta_l$, then the logic flow ends at step 537 where the remote unit is handed off to the AMPS base station underlying the CDMA base station that the threshold event was received.

If at step 527 it is determined that ($\Phi_i-\tau_l$)>$\delta_l$ then at step 531 it is determined if the current threshold count is equal to zero. If at step 531 it is determined that the current threshold count is equal to zero, then at step 532 the current threshold count is set equal to one, and the logic flow returns to step 503. If at step 531 it is determined that the current threshold count is not equal to zero, then the remaining CDMA base station phase shift measurements are obtained (step 533) and the remote unit is handed off to an AMPS base station underlying the CDMA base station with the smallest phase shift.

Returning to step 513, if it is determined that a PSMM has been received, the logic flow continues to step 515 where the identity of the CDMA base station supplying the reference pilot is utilized from the PSMM. Next, at step 517, $\Phi_1$, $\Phi_2$, and $\Phi_3$ are determined by the cellular infrastructure equipment in the manner described above. Once $\Phi_1$, $\Phi_2$, $\Phi_3$, and the identity of the CDMA base station supplying the reference pilot are known, then $\Theta_1$, $\Theta_2$, and $\Theta_3$ are calculated (step 521). At step 523, the CDMA cell with the smallest $\Theta$ value is determined and the remote unit is handed off to the underlying AMPS base station corresponding to the CDMA cell with the lowest $\Theta$ value (at step 525). Waiting until a threshold event is received by the CDMA base station prior to handing off to an AMPS base station allows the remote unit to travel farther into the CDMA coverage area of the border cell prior to being handed off to the underlying AMPS base station increasing CDMA system capacity.

Figure 6:
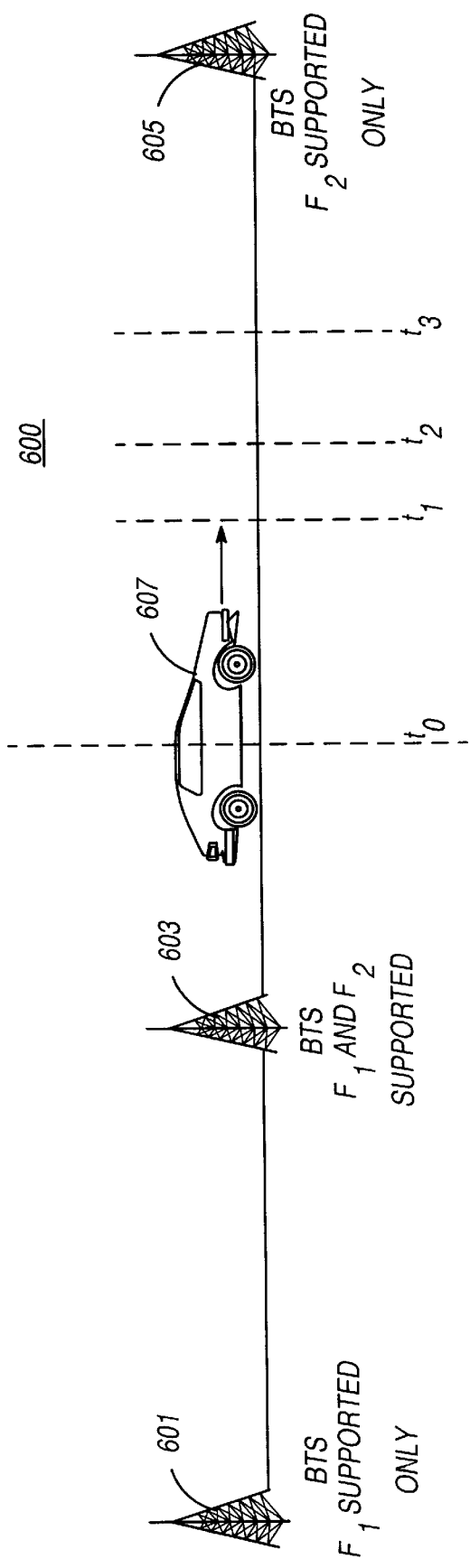
FIG. 6 illustrates operation of a CDMA communication system in accordance with an alternate embodiment of the present invention.

FIG. 6 illustrates operation of a CDMA communication system 600 in accordance with an alternate embodiment of the present invention. As shown in FIG. 6 remote unit 607 is traveling between CDMA base station 603 and CDMA base station 605 with CDMA base station 603 capable of operating on frequencies within groups F1 and F2 and CDMA base station 605 capable of operating on frequencies within group F2 only. Additionally CDMA base station 601 capable of supporting frequencies within group F1 only is shown. In an alternate embodiment, a thresholding event based on corrected phase measurements is used to hand off remote unit 607 from a frequency within group F1, to a frequency within F2, prior to entering soft handoff between CDMA base station 603 and CDMA base station 605.

Operation of communication system 600 occurs as follows: At time $t_O$ remote unit 607 is operating on a frequency within group F1 and communicating with CDMA base station 603. At time $t_1$ remote unit's 607 phase shift becomes greater than a threshold value, which indicates to the CDMA infrastructure equipment that remote unit 607 is moving towards CDMA base station 605 and may need to go into a soft handoff state with CDMA base station 603 and CDMA base station 605. Since remote unit 607 (operating on a frequency within group F1) is unable to be placed into a soft-handoff mode between CDMA base station 603 and CDMA base station 605, remote unit 607 is handed off to a frequency within group F2. At time $t_2$ remote unit 607 is close enough to CDMA base station 605 to be placed into soft handoff with CDMA base station 603 and CDMA base station 605. Finally, at time $t_3$ remote unit moves out of the coverage area of CDMA base station 603 and communicates solely with CDMA base station 605 on a frequency within group F2. In addition to switching from frequencies F1 to F2 as remote unit 607 moves towards CDMA base station 605, remote unit 607 may be switched back to operating on a frequency within group F1 upon approaching CDMA base station 603 and crossing a threshold. This will allow remote unit 607 to eventually enter soft handoff with CDMA base station 601, which supports only frequencies within group F1.

Figure 7:
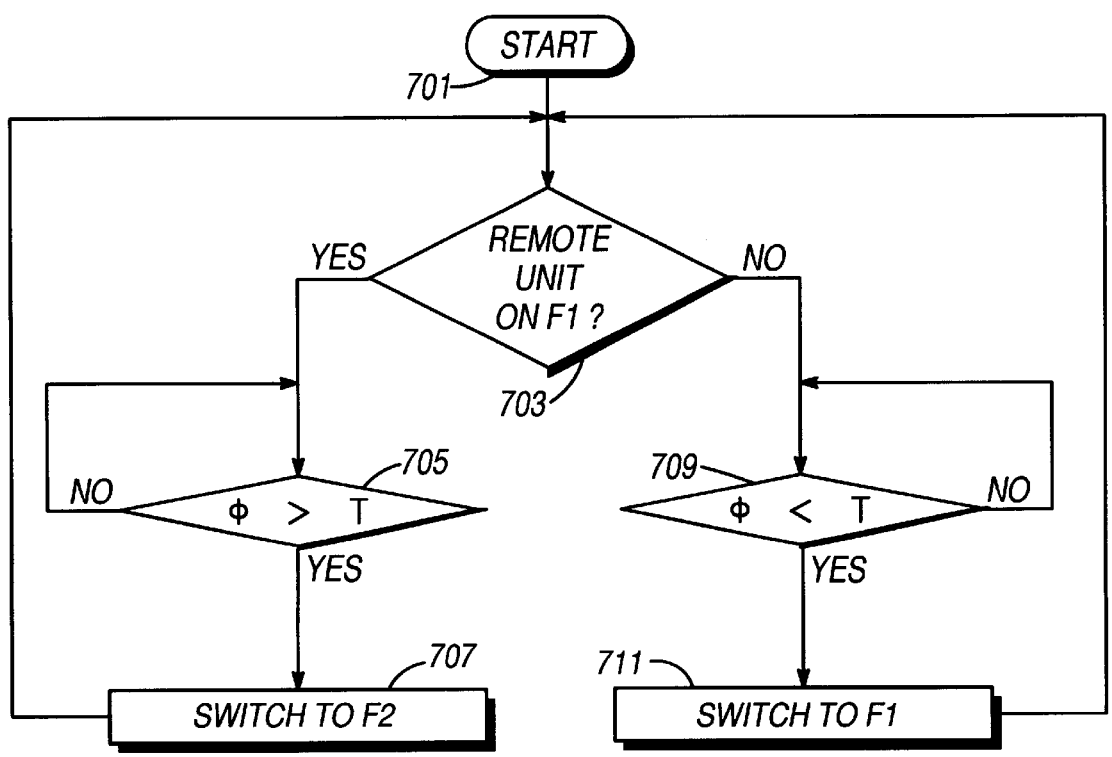
FIG. 7 illustrates a logic-flow diagram for handing off a remote unit from a CDMA protocol to an AMPS protocol in accordance with an alternate embodiment of the invention.

FIG. 7 illustrates a flow chart for operating communication system 600 in accordance with an alternate embodiment of the present invention. The logic flow starts at step 701. At step 703, the infrastructure equipment determines if remote unit 607 is operating on a frequency associated with group F1. If at step 703 it is determined that remote unit 607 is operating on a frequency associated with group F1, then the logic flow continues to step 705. At step 705 the cellular infrastructure equipment determines if remote unit 607 has crossed a threshold. In an alternate embodiment, this step is accomplished as described above, by determining a $\Phi$ value for the remote unit, and determining if remote unit's 607 $\Phi$ value is greater than a threshold value ($\tau$). If at step 705 it is determined that remote unit's 607 $\Phi$ value has not exceeded a threshold value, then the logic flow simply returns to step 705. If at step 705 it is determined that remote unit's 607 $\Phi$ value has exceeded the value to a threshold value, then remote unit is handed off to a frequency associated with F2 and the logic flow returns to step 703.

Returning to step 703, if at step 703 it is determined that remote unit 607 is not operating on a frequency associated with group F1, then the logic flow continues to step 709 where the cellular infrastructure equipment determines if remote unit 607 has crossed a threshold. In an alternate embodiment, this step is accomplished as described above, by determining a $\Phi$ value for remote unit 607, and determining if remote unit's 607 R value is less than a threshold value ($\tau$). If at step 709 it is determined that remote unit's 607 $\Phi$ value is not less than a threshold value, then the logic flow simply returns to step 709. If at step 709 it is determined that remote unit's 607 $\Phi$ value is less than the threshold value, then the logic flow continues to step 711 where the remote unit is handed off to a frequency associated with group F1, and the logic flow continues to step 703.

The descriptions of the invention, the specific details, and the drawings mentioned above, are not meant to limit the scope of the present invention. For example, in addition to handing off from a CDMA to an AMPS protocol, the invention can be employed for performing hard handoffs between CDMA cells. It is the intent of the inventors that various modifications can be made to the present invention without varying from the spirit and scope of the invention, and it is intended that all such modifications come within the scope of the following claims.

What is claimed is:

1. A method for performing handoff in a spread-spectrum communication system, the method comprising the steps of:

measuring a time between a base station's transmitted signal and a corresponding received signal transmitted from a remote unit to produce a measured phase shift;

comparing the measured phase shift to a threshold to produce a comparison;

correcting the measured phase shift to produce a corrected phase shift, wherein the step of correcting comprises adjusting the measured phase shift based on a time between a second base station's transmitted signal and a corresponding signal received at the second base station; and handing off the remote unit based on the corrected phase shift and the comparison.

2. The method of claim 1 wherein the step of correcting the measured phase shift comprises the steps of:

determining a reference base station to produce a determined reference base station; and determining a corrected phase shift based on the measured phase shift and the determined reference base station.

3. The method of claim 1 wherein the step of handing off the remote unit comprises the steps of:

determining a smallest corrected phase shift measurement; and handing off the remote unit to a first base station having a first coverage area, said first coverage area related to a second coverage area of a second base station, said second base station having the smallest corrected phase shift measurement.

4. The method of claim 1 further comprising the steps of:

determining if a non-border base station is part of an active set to produce a determination; and handing off a remote unit based on the determination, the corrected phase shift, and the comparison.

5. The method of claim 1 wherein the spread-spectrum communication system is a code-division, multiple-access (CDMA) communication system.

6. The method of claim 1 wherein the step of handing off the remote unit comprises the step of handing off the remote unit from a Code-Division, Multiple-Access (CDMA) protocol to an Advanced Mobile Phone Service (AMPS) protocol.

7. A method for handoff in a spread-spectrum communication system, the method comprising the steps of:

communicating between a first base station and a remote unit on a first frequency;

measuring a time between a base station's transmitted signal and a corresponding received signal transmitted from a remote unit to produce a measured phase shift;

comparing the phase shift to a threshold to produce a comparison; and communicating between the first base station and the remote unit on a second frequency said step of communicating based on the comparison.

8. The method of claim 7 wherein the step of measuring a phase shift comprises the step of measuring a corrected phase shift.

9. The method of claim 8 wherein the step of measuring a corrected phase shift comprises the steps of:

determining a reference base station to produce a determined reference base station; and determining a corrected phase shift based on the measured phase shift and the determined reference base station.

10. The method of claim 7 wherein the spread-spectrum communication system is a code-division, multiple-access (CDMA) communication system.

11. A method of handoff in a Code-Division, Multiple-Access (CDMA) communication system, the method comprising the steps of:

communicating with a plurality of base stations;

measuring a plurality of times between the plurality of base station's transmitted signals and corresponding received signals transmitted from a remote unit to produce a plurality of phase shift measurements;

determining if a base station existing within the plurality of base stations is a non-border base station, to produce a base station determination;

comparing the plurality of phase shift measurements to a plurality of thresholds to produce a comparison;

correcting the plurality of phase shift measurements to produce a plurality of corrected phase shift measurements wherein the step of correcting comprises adjusting the plurality of phase shift measurements based on a time between a second base station's transmitted signal and a corresponding signal received at the second base station; and handing off a remote unit based on the plurality of corrected phase shift measurements, the comparison, and the base station determination.

12. The method of claim 11 wherein the step of correcting the plurality of phase shift measurements comprises the steps of:

determining a reference base station to produce a determined reference base station; and determining a plurality of corrected phase shifts based on the determined reference base station and the plurality of phase shift measurements.

13. The method of claim 11 wherein the step of handing off the remote unit comprises the step of handing off the remote unit from a Code-Division, Multiple-Access (CDMA) protocol to an Advanced Mobile Phone Service (AMPS) protocol.

14. An apparatus performing handoff in a communication system, the apparatus comprising:

means for measuring an uncorrected phase shift of a remote unit to produce a measured phase shift, wherein the uncorrected phase shift is based on a time between a base station's transmitted signal and a corresponding signal received at the base station;

means, coupled to means for measuring, for comparing the measured phase shift to a threshold to produce a comparison;

means, coupled to means for comparing, for correcting the measured phase shift to produce a corrected phase shift, wherein the corrected phase shift is based on adjusting the uncorrected phase shift based on a time between a second base station's transmitted signal and a corresponding signal received at the second base station; and means, coupled to means for correcting, for handing off the remote unit based on the corrected phase shift and the comparison.

15. The apparatus of claim 14 wherein the spread-spectrum communication system is a code-division, multiple-access (CDMA) communication system.

16. The apparatus of claim 14 wherein the means for handing off the remote unit comprises means for of handing off the remote unit from a Code-Division, Multiple-Access (CDMA) protocol to an Advanced Mobile Phone Service (AMPS) protocol.

* * * * *